US012525367B2

United States Patent
Lee

(10) Patent No.: US 12,525,367 B2
(45) Date of Patent: Jan. 13, 2026

(54) METHOD OF DYNAMIC CONTROL ROD REACTIVITY MEASUREMENT

(71) Applicant: KOREA HYDRO & NUCLEAR POWER CO., LTD., Gyeongju-si (KR)

(72) Inventor: Eun-ki Lee, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 426 days.

(21) Appl. No.: 18/019,129

(22) PCT Filed: Aug. 3, 2021

(86) PCT No.: PCT/KR2021/010171
§ 371 (c)(1),
(2) Date: Feb. 1, 2023

(87) PCT Pub. No.: WO2022/030966
PCT Pub. Date: Feb. 10, 2022

(65) Prior Publication Data
US 2023/0298774 A1 Sep. 21, 2023

(30) Foreign Application Priority Data

Aug. 5, 2020 (KR) .................. 10-2020-0098102

(51) Int. Cl.
*G21C 17/104* (2006.01)
(52) U.S. Cl.
CPC ................... *G21C 17/104* (2013.01)
(58) Field of Classification Search
CPC .............. G21C 17/10; G21C 17/104
USPC ................................. 376/245, 254
See application file for complete search history.

(56) References Cited

FOREIGN PATENT DOCUMENTS

| JP | 02-008796 | 1/1990 |
|----|-----------|--------|
| JP | 2011-002301 | 1/2011 |
| JP | 2015-148524 | 8/2015 |
| JP | 2019-502117 | 1/2019 |

(Continued)

OTHER PUBLICATIONS

Lee, E. K., et al. "New dynamic method to measure rod worths in zero power physics test at PWR startup." Annals of Nuclear Energy 32.13 (2005): 1457-1475. (Year: 2005).*

(Continued)

*Primary Examiner* — Jinney Kil
(74) *Attorney, Agent, or Firm* — LEX IP MEISTER, PLLC

(57) ABSTRACT

A method of dynamic control rod reactivity measurement for a reactor using a fission chamber as an out-of-reactor measuring instrument includes: maintaining the reactor in a critical state having a set output by inserting a reference control bank into a reactor core to a first depth; completely inserting the reference control bank into the reactor core from the first depth at a maximum allowable speed and immediately completely withdrawing the reference control bank from the reactor core at the maximum allowable speed, and measuring a first signal of the out-of-reactor measuring instrument from before the insertion of the reference control bank to after the withdrawal of the reference control bank; and determining static controllability of the reference control bank by adding residual controllability measurement value of the reactor to a first static reactivity of the reactor calculated using the first signal of the out-of-reactor measuring instrument.

6 Claims, 2 Drawing Sheets

(56) References Cited

FOREIGN PATENT DOCUMENTS

| KR | 10-2006-0041043 | 5/2006 | |
|---|---|---|---|
| KR | 10-0598037 | 7/2006 | |
| KR | 100598037 B1 * | 7/2006 | ............... G21C 7/08 |
| KR | 10-1604100 | 3/2016 | |
| KR | 10-2281234 | 7/2021 | |

OTHER PUBLICATIONS

Lee, E. K., et al. "Application of the dynamic control rod reactivity measurement method to Korea Standard Nuclear Power Plants." Proceedings of the PHYSOR. 2004. (Year: 2004).*

Lee, Eun-ki, et al. "Current Status and Future Works in Dynamic Control Rod Worth Measurement Method in KOREA." Transactions of the Korean Nuclear Society Autumn Meeting, Gyeongju, Korea (Oct. 29, 2015).

Song, J. S., et al. "Dynamic control rod worth measurement of Yonggwang Unit 1 cycle 14." Proceedings of Korean Nuclear Society conference in spring, 2002 (May 1, 2002).

* cited by examiner

METHOD OF DYNAMIC CONTROL ROD REACTIVITY MEASUREMENT

TECHNICAL FIELD

The present disclosure relates to a method of dynamic control rod reactivity measurement.

BACKGROUND ART

As disclosed in Korean Patent Publication No. 10-0598037 and Korean Patent Publication No. 10-1604100, in the method of dynamic control rod reactivity measurement in a light water reactor, a test prerequisite is that the number of neutrons incident on an out-of-reactor measuring instrument and a signal of the out-of-reactor measuring instrument correspond linearly.

When an uncompensated ion chamber is used as an out-of-reactor measuring instrument, since a current (or voltage) signal generated by the out-of-reactor measuring instrument satisfies these conditions, the control rod to be measured is inserted into and withdrawn from a reactor core at maximum speed. After a base signal is removed from the signal of the out-of-reactor measuring instrument obtained at this time, a dynamic reactivity of the reactor may be obtained by using the signal during the out-of-reactor measurement, and a final static reactivity of the reactor may be obtained by applying a dynamic to static conversion factor (DSCF) to the obtained dynamic reactivity.

However, recently, when a fission chamber with low sensitivity is used as the out-of-reactor measuring instrument, it was confirmed that the number of neutrons incident on the out-of-reactor measuring instrument and the signal of the out-of-reactor measuring instrument do not maintain linearity at a low output within a test range.

The fission chamber may provide both a pulse signal representing the number of pulses per unit time and a continuous voltage signal corresponding to the reactivity of the reactor. It was confirmed that the pulse signal loses its linearity because the pulses overlap each other (two or three pulses are recognized as one pulse) at a high output of the reactor within the test range, and the voltage signal loses its linearity due to perturbation and noise at the low output of the reactor. In particular, since the voltage signal of the fission chamber is obtained using a variance between a pulse current distribution and an average current value, the linearity is not mathematically guaranteed at low output. In addition, a method of linking a pulse signal with a voltage signal of a fission chamber may be considered, but evaluation results vary depending on how the region maintaining linearity is selected, and an evaluation result varies depending on how an area that maintains linearity is selected, and additional research is required because a mathematical background is not accompanied in a voltage signal post-processing method.

Therefore, in the case of the reactor using the fission chamber as the out-of-reactor measuring instrument, it is necessary to perform a method of dynamic control rod reactivity measurement within a range where the number of neutrons incident on the fission chamber and the number of pulses per unit time guarantee linearity.

DISCLOSURE

Technical Problem

The present invention has been made in an effort to provide a method of dynamic control rod reactivity measurement having advantages of safely measuring static controllability of a control rod in a reactor using a fission chamber as an out-of-reactor measuring instrument.

Technical Solution

An exemplary embodiment of the present invention provides a method of dynamic control rod reactivity measurement for a reactor using a fission chamber as an out-of-reactor measuring instrument, including: maintaining the reactor in a critical state having a set output by inserting a reference control bank into a reactor core to a first depth; completely inserting the reference control bank into the reactor core from the first depth at a maximum allowable speed and immediately completely withdrawing the reference control bank from the reactor core at the maximum allowable speed, and measuring a first signal of the out-of-reactor measuring instrument from before the insertion of the reference control bank to after the withdrawal of the reference control bank; and determining static controllability of the reference control bank by adding residual controllability measurement value of the reactor to a first static reactivity of the reactor calculated using the first signal of the out-of-reactor measuring instrument.

The method may further include: maintaining the reactor in the critical state having the set output by inserting a test control bank into the reactor core to a second depth when the reactor has the set output; completely inserting the test control bank into the reactor core from the second depth at a maximum allowable speed and immediately completely withdrawing the test control bank from the reactor core at the maximum allowable speed, and measuring a second signal of the out-of-reactor measuring instrument from before the insertion of the test control bank to after the withdrawal of the test control bank; and determining static controllability of the test control bank by adding the residual controllability measurement value of the reactor to a second static reactivity of the reactor calculated using the second signal of the out-of-reactor measuring instrument.

The second depth may be deeper than the first depth.

The set output of the reactor may be an output at which pulses of the first signal measured by the out-of-reactor measuring instrument do not overlap each other.

The set output of the reactor may be $10^5$ cps.

The residual controllability measurement value of the reactor may be 50 pcm to 80 pcm.

Advantageous Effects

According to an exemplary embodiment, it is possible to provide a method of dynamic control rod reactivity measurement capable of safely measuring static controllability of a control rod in a reactor using a fission chamber as an out-of-reactor measuring instrument.

MODE FOR INVENTION

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

In addition, unless explicitly described to the contrary, the word "comprise", and variations such as "comprises" or "comprising", will be understood to imply the inclusion of stated elements but not the exclusion of any other elements.

After loading nuclear fuel into the reactor core, controllability of a control rod needs to be measured to confirm that a nuclear design report used in reactor safety analysis is appropriate. A plurality of control rods are installed in a reactor core when it is necessary to completely terminate a nuclear reaction in the reactor core due to adjustment of heat output or axial output distribution or various causes. The plurality of control rods do not operate individually, but are managed as a plurality of control banks, such as 6 or 10, depending on the size of the reactor. One control bank includes 4 or 8 control rod assemblies, and one control rod assembly may include 4 or 12 individual control rods.

Hereinafter, the method of dynamic control rod reactivity measurement may mean measuring the reactivity of the control bank, not measuring the reactivity of individual control rods.

Hereinafter, a method of dynamic control rod reactivity measurement according to an exemplary embodiment will be described with reference to FIGS. 1 and 2. The method of dynamic control rod reactivity measurement according to the exemplary embodiment is a method of dynamic control rod reactivity measurement for a reactor using a fission chamber as an out-of-reactor measuring instrument, but is not limited thereto.

Figure 1:
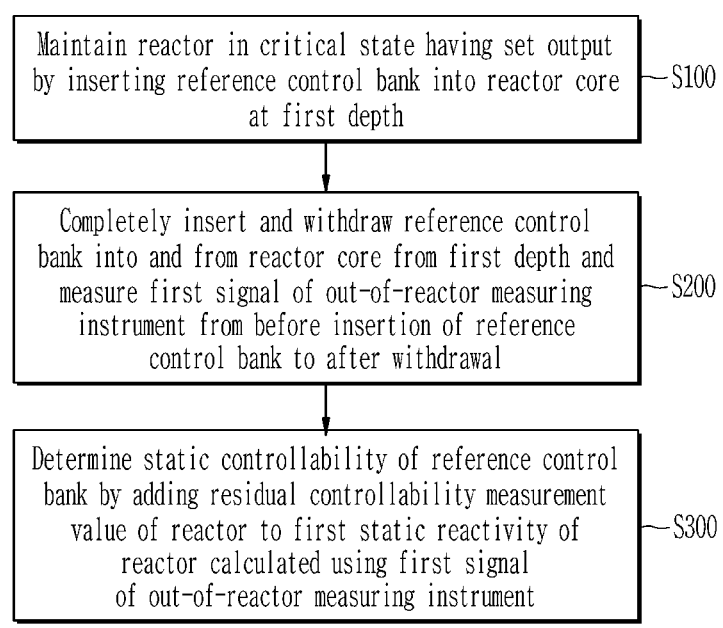
FIG. 1 is a flowchart illustrating a method of dynamic control rod reactivity measurement according to an exemplary embodiment.

FIG. 1 is a flowchart illustrating the method of dynamic control rod reactivity measurement according to the exemplary embodiment. FIG. 2 is a graph for describing the method of dynamic control rod reactivity measurement according to the exemplary embodiment. An x-axis of each of (a), (b), and (c) of FIG. 2 represents time, a y-axis of (a) of FIG. 2 represents a control rod position which is a depth of a control bank inserted into a core, a y-axis of (b) of FIG. 2 represents cps which is the output of the reactor, and a y-axis of (c) of FIG. 2 represents pcm which is the dynamic reactivity of the reactor.

Figure 2:
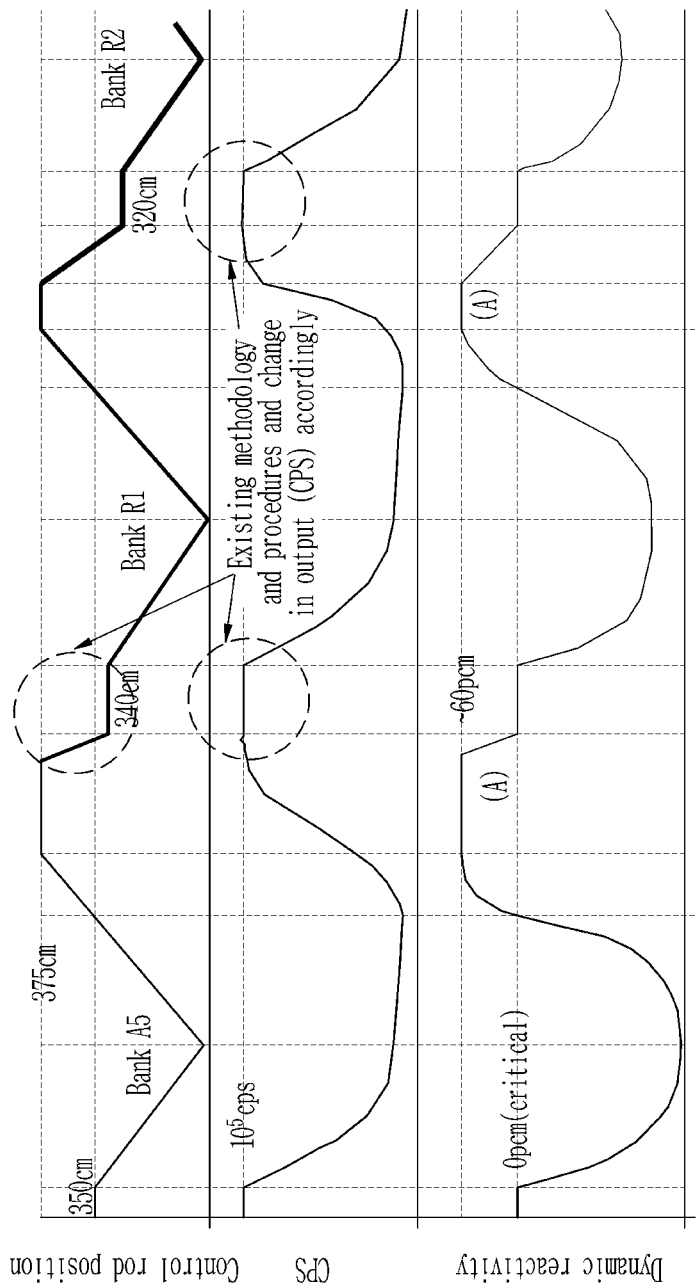
FIG. 2 is a graph for describing the method of dynamic control rod reactivity measurement according to the exemplary embodiment.

Referring to FIGS. 1 and 2, a reference control bank (Bank A5) is inserted into the reactor core to a first depth to maintain the reactor in a critical state having a set output (S100).

Specifically, the reference control bank (Bank A5) is inserted into a non-critical state reactor core having a dynamic reactivity of 60 pcm to a first depth of about 20 cm to 40 cm to reach a control rod position of 350 cm, and thus, the reactor is maintained in a critical state with a set output of $10^5$ cps. Here, $10^5$ cps, which is the set output of the reactor, is a maximum output at which pulses do not overlap each other in a pulse signal of the fission chamber which is the out-of-reactor measuring instrument. That is, the set output of the reactor is $10^5$ cps which is the maximum output at which pulses do not overlap each other in the pulse signal of the out-of-reactor measuring instrument.

Next, the reference control bank (Bank A5) is completely inserted into the reactor core from the first depth at a maximum allowable speed and immediately completely withdrawn from the reactor core at the maximum allowable speed, and measures the first signal of the out-of-reactor measuring instrument from before the insertion of the reference control bank to after the withdrawal of the reference control bank (S200).

Specifically, without withdrawing the reference control bank (Bank A5) from the first depth, the reference control bank (Bank A5) is completely inserted into the reactor core from the control rod position of 350 cm, which is an initially inserted first depth, at the maximum allowable speed and immediately completely withdrawn from the reactor core to the control rod position of 375 cm at the maximum allowable speed. In this case, the first signal, which is the pulse signal of the out-of-reactor measuring instrument, is measured from 1 minute before the insertion of the reference control bank (Bank A5) to 1 minute after the withdrawal of the reference control bank (Bank A5).

Meanwhile, Korean Patent Publication No. 10-0598037, which is the related document, discloses that the control bank is completely withdrawn from the first depth, and then the control bank is completely inserted into and withdrawn from the reactor core at the maximum allowable speed, thereby inserting and withdrawing the control bank while the output of the reactor core fluctuates.

Next, the static controllability of the reference control bank (Bank A5) is determined by adding a residual controllability measurement value of the reactor to a first static reactivity of the reactor calculated using the first signal of the out-of-reactor measuring instrument (S300).

Specifically, the control rod position from the control rod position, which is an insertion height of the reference control bank (Bank A5), to the complete insertion of the control rod, is input to the RAST-K code to produce a density to response conversion factor (DRCF) and a dynamic to static conversion factor (DSCF). The first static reactivity of the reactor is calculated by inputting the produced DSCF and DRCF, the measured first signal of the out-of-reactor measuring instrument, and the control rod position, which is the insertion height of the reference control bank (Bank A5), to the set computational code.

Meanwhile, Korean Patent Publication No. 10-0598037, which is the related document, discloses that DSCF and DRCF may be calculated in advance, but the method of dynamic control rod reactivity measurement according to the exemplary embodiment produces the DSCF and DRCF each time since a control rod height corresponding to 60 pcm, which is the reactivity to maintain the critical state of the reactor, may vary for each control bank in the field, In addition, since the out-of-reactor measuring instrument, which is the fission chamber, selectively uses only the pulse signal according to the number of neutrons and the uranium reaction, the out-of-reactor measuring instrument does not require a base signal compensation algorithm, and may be improved not to apply the base signal compensation algorithm in the set computational code.

The final static controllability of the reference control bank (Bank A5) is determined by adding 60 pcm, which is the residual controllability measurement value (controllability measurement value in section (A) of (c) of FIG. 2) of the reactor, to the first static reactivity of the reactor calculated in the set computational code. Then, the final static controllability of the reference control bank (Bank A5) is compared with the static controllability of the reference control bank in the nuclear design report.

Meanwhile, the residual controllability measurement value may be 50 pcm to 80 pcm.

On the other hand, Korean Patent Publication No. 10-0598037, which is the related document, discloses that the final static controllability of the control bank is calculated in the set computational code, but the method of dynamic control rod reactivity measurement according to the exemplary embodiment determines by adding 60 pcm, which is the residual controllability measurement value, to the static controllability which is the first static reactivity calculated in the set computational code.

Next, when the reactor has the set output, a first test control bank (Bank R1) is inserted into the reactor core to a second depth to maintain the reactor in a critical state with a set output.

Specifically, since the reference control bank (Bank A5) is completely withdrawn from the reactor core, a direct reactivity of 60 pcm is added to the reactor core, so the cps, which is the output of the reactor, increases exponentially. When the reactor reaches the set output of $10^5$ cps, the first test control bank (Bank R1) is inserted into the reactor core to the second depth deeper than the first depth of the reference control bank (Bank A5) to reach the control rod position of 340 cm, and is maintained for about 100 seconds in the critical state with the set output of $10^5$ cps. When the reactor is maintained in the critical state, the control rod position, which is the insertion position of the first test control bank (Bank R1), is a position compensated for 60 pcm, and when the reactor is maintained for 100 seconds, the late neutron group of the reactor sufficiently stops fluctuating. In addition, since the reactor maintains $10^5$ cps, which is the set output in which pulses do not overlap each other in the pulse signal of the out-of-reactor measuring instrument, a linearity problem does not occur in the pulse signal measured by the out-of-reactor measuring instrument.

Next, the first test control bank (Bank R1) is completely inserted into the reactor core from the second depth at a maximum allowable speed and immediately completely withdrawn from the reactor core at the maximum allowable speed, and measures the second signal of the out-of-reactor measuring instrument from before the insertion of the first test control bank (Bank R1) to after the withdrawal of the first test control bank.

Specifically, without withdrawing the first test control bank (Bank R1) from the second depth, the reference control bank (Bank A5) is completely inserted into the reactor core from the control rod position of 340 cm, which is an initially inserted second depth, at the maximum allowable speed and immediately completely withdrawn from the reactor core to the control rod position of 375 cm at the maximum allowable speed. In this case, the second signal, which is the pulse signal of the out-of-reactor measuring instrument, is measured from 1 minute before the insertion of the first test control bank (Bank R1) to 1 minute after the withdrawal of the first test control bank (Bank R1).

Next, the static controllability of the first test control bank (Bank R1) is determined by adding the residual controllability measurement value of the reactor to the second static reactivity of the reactor calculated using the second signal of the out-of-reactor measuring instrument.

Specifically, the control rod position from the control rod position, which is an insertion height of the first test control bank (Bank R1), to the complete insertion of the control rod, is input to the RAST-K code to produce the density to response conversion factor (DRCF) and the dynamic to static conversion factor (DSCF). The second static reactivity of the reactor is calculated by inputting the produced DSCF and DRCF, the measured second signal of the out-of-reactor measuring instrument, and the control rod position, which is the insertion height of the first test control bank (Bank R1), to the set computational code.

The final static controllability of the first test control bank (Bank R1) is determined by adding 60 pcm, which is the residual controllability measurement value (controllability measurement value in section (A) of (c) of FIG. 2) of the reactor, to the second static reactivity of the reactor calculated in the set computational code. Then, the final static controllability of the first test control bank (Bank R1) is compared with the static controllability of the first test control bank in the nuclear design report.

Next, the final static controllability of the second test control bank (Bank R2) is determined by performing the same method as the first test control bank (Bank R1) described above for the second test control bank (Bank R2), and is compared with the static controllability of the second test control bank of the nuclear design report.

Specifically, when the reactor reaches the set output of $10^5$ cps, the reactor is maintained in the critical state with the set power of $10^5$ cps by inserting the second test control bank (Bank R2) into the core of the nuclear reactor to a third depth deeper than the second depth of the first test control bank (Bank R1) to reach the control rod position of 320 cm, and then, the final static controllability of the second test control bank (Bank R2) is determined by performing the complete insertion and withdrawal of the second test control bank (Bank R2) in the same method as the first test control bank (Bank R1) described above and is compared with the static controllability of the second test control bank in the nuclear design report.

As described above, in the method of dynamic control rod reactivity measurement according to the exemplary embodiment, a time point at the control rod is completely withdrawn is not a starting point, but a time point at which the control rod to be measured is partially inserted into the core becomes a measuring start point. In the existing methodology and procedure disclosed in Korean Patent Publication No. 10-0598037 which is the related document, the control rod is inserted while the output of the reactor is fluctuating, but a new procedure, which is the method of dynamic control rod reactivity measurement according to the exemplary embodiment, always starts at a critical time point of the reactor.

The controllability from the time point at which the control rod is completely withdrawn to the critical time point is regarded as the residual controllability. Since the reactivity calculated from the pulse signal of the out-of-reactor measuring instrument is strictly a dynamic reactivity, but the core reactivity within about 120 pcm shows a deviation of about 1% in the dynamic to static reactivity value, when a reactivity calculator yields a reactivity between 20 pcm and 70 pcm, the reactivity is considered a static reactivity even though it is the dynamic reactivity. Therefore, the reactivity up to the position where the control bank is partially inserted into the core is the same as the residual controllability (confirmed each time in the section (A) of (c) of FIG. 2).

The actual insertion position of the test control bank in the reactor site where the method of dynamic control rod reactivity measurement will be performed may not match the insertion position calculated by design. Since a critical boron concentration of the reactor is different and the controllability of the reference control bank is determined between 60 pcm and 70 pcm, when the controllability of the reference control bank changes to 60 pcm, 65 pcm, 70 pcm, etc. depending on the situation, the insertion position of the test control bank does not also match the calculated value. In particular, when the controllability of the test control bank differs from the design value, the insertion position will also change accordingly.

Therefore, the method of dynamic control rod reactivity measurement according to the exemplary embodiment performs various transient analyses from the insertion position of the control bank to the complete insertion in the reactor site, produces the DSCF and DRCF, and then substitutes the DSCF and DRCF into the measurement data to evaluate the static controllability of the control bank.

The basic procedure for producing the DSCF and DRCF is the same as that disclosed in Korean Patent Publication No. 10-0598037 which is the related document. However, in the related document, the state in which the control bank is completely withdrawn while the output of the reactor is fluctuating is the starting point for analysis, but in the method of dynamic control rod reactivity measurement according to the exemplary embodiment, the state in which the reactor is in the critical state while the control bank is partially inserted into the core is the starting point for analysis.

Therefore, since Korean Patent Publication No. 10-0598037, which is the related document, requires data for increasing the signal of the out-of-reactor measuring instrument for one minute before inserting the control bank at the maximum speed, when the DSCF and DRCF are produced, simulation is necessarily performed to continuously and sequentially move all of the reference control bank, the first test control bank, and the second test control bank, but the method for measuring dynamic control rod controllability according to the exemplary embodiment performs the test at the critical point of the reactor, and thus, may independently simulate and process only once the DSCF and DRCF of the reference control bank (Bank A5), the first test control bank (Bank R1), and the second test control bank (Bank R2). Therefore, regardless of whether to measure the static controllability of the first test control bank (Bank R1) or the static controllability of the second test control bank (Bank R2) in the reactor site, for each control bank, the DSCF and DRCF may be produced immediately corresponding to the given insertion position and do not affect other control banks.

Since the method of dynamic control rod reactivity measurement according to the exemplary embodiment needs to immediately produce and utilize the DSCF and DRCF in response to test conditions in the reactor site, the RAST-K and INVERSE 2.0 code which is the set computational code may be sequentially used. However, the entire operation may be automated, and from the user's point of view, it is superficially no different from executing only one INVERSE 1.0 code which is the existing set computational code, but the internal processing has a difference in calculation flow as the design and analysis are conducted on site.

As described above, the method of dynamic control rod reactivity measurement according to the exemplary embodiment may measure the controllability of the dynamic control rod for the reactor using the fission chamber as the out-of-reactor measuring instrument.

In addition, the method of dynamic control rod reactivity measurement according to the exemplary embodiment performs the complete insertion and withdrawal of the control bank without changing the output of the reactor in the critical state of the reactor, thereby safely measuring the static controllability of the control rod compared to the preceding literature in which the output of the nuclear reactor fluctuates.

In addition, the method of dynamic control rod reactivity measurement according to the exemplary embodiment performs the complete insertion and withdrawal of the control bank at $10^5$ cps where the set output of the reactor in the critical state of the reactor is the maximum output condition where the pulses of the pulse signal of the out-of-furnace instrument do not overlap each other and always maintain linearity, thereby minimizing the opportunity of perturbation entry section to expect the excellent evaluation result.

In addition, since the method of dynamic control rod reactivity measurement according to an exemplary embodiment may utilize the dynamic control rod reactivity technique within the range of ensuring the linearity of the pulse signal of the out-of-reactor measuring instrument, and thus, may shorten the test time by 7 hours compared to the conventional boron dilution method and control rod exchange method, when the method of dynamic control rod reactivity measurement according to an exemplary embodiment is applied to 6 units using the fission chamber, so the effect of increasing power generation during 5 cycles of the technology life may be expected.

Although the exemplary embodiment of the present invention has been described in detail hereinabove, the scope of the present invention is not limited thereto. That is, several modifications and alterations made by a person of ordinary skill in the art using a basic concept of the present invention as defined in the claims fall within the scope of the present invention.

DESCRIPTION OF REFERENCE SIGNS

Reference control bank (Bank A5), First test control bank (Bank R1), Second test control bank (Bank R2)

The invention claimed is:

1. A method of dynamic control rod reactivity measurement for a reactor using a fission chamber as an out-of-reactor measuring instrument, the method comprising:
   maintaining, for a first period of time, the reactor in a critical state having a set output by inserting a reference control bank into a reactor core to a first depth;
   completely inserting the reference control bank into the reactor core from the first depth at a first maximum allowable speed and immediately completely withdrawing the reference control bank from the reactor core at the first maximum allowable speed, and measuring a first signal of the out-of-reactor measuring instrument from before the complete insertion of the reference control bank to after the withdrawal of the reference control bank;
   maintaining, for a second period of time, the reactor in the critical state having the set output by inserting a test control bank into the reactor core to a second depth;
   determining a residual reactivity measurement value, wherein the residual reactivity measurement value is a difference between a first dynamic reactivity of the reactor core when the reference control bank is completely withdrawn from the reactor core and a second dynamic reactivity of the reactor core when the test control bank is inserted to the second depth; and
   determining a static reactivity of the reference control bank by adding the residual reactivity measurement value to a first static reactivity of the reactor, wherein the first static reactivity is calculated using the first signal of the out-of-reactor measuring instrument.

2. The method of claim 1, further comprising:
   completely inserting the test control bank into the reactor core from the second depth at a second maximum allowable speed and immediately completely withdrawing the test control bank from the reactor core at the second maximum allowable speed, and measuring a second signal of the out-of-reactor measuring instrument from before the complete insertion of the test control bank to after the withdrawal of the test control bank; and determining a static reactivity of the test control bank by adding the residual reactivity measurement value to a second static reactivity of the reactor, wherein the second static reactivity is calculated using the second signal of the out-of-reactor measuring instrument.

3. The method of claim 2, wherein:

the second depth is deeper than the first depth.

4. The method of claim 1, wherein:

the set output of the reactor is an output at which pulses of the first signal measured by the out-of-reactor measuring instrument do not overlap each other.

5. The method of claim 4, wherein:

the set output of the reactor is 105 cps.

6. The method of claim 1, wherein:

the residual reactivity measurement value of the reactor is 50 pcm to 80 pcm.

* * * * *